United States Patent Office 3,195,355
Patented July 20, 1965

3,195,355
DEVICE FOR INJECTING SMALL KNOWN VOLUMES OF LIQUID INTO A HIGH VACUUM SYSTEM
Ernest W. Boyer and Ernest E. McKelvey, Ponca City, Okla., assignors to Continental Oil Company, Ponca City, Okla., a corporation of Delaware
Filed Dec. 11, 1962, Ser. No. 243,819
9 Claims. (Cl. 73—422)

This invention relates to a device for injecting small known volumes of liquid in an air free condition into a high vacuum system. More particularly, but not by way of limitation, the present invention relates to a device through the use of which very small volumes of a liquid material may be injected at a high temperature and in a substantially air free state into a high vacuum system for analysis or other purposes.

A number of devices and types of apparatus have heretofore been proposed for accomplishing the introduction of a small volume of a liquid material into a high vacuum system without disrupting the vacuum system, or contaminating the sample which is injected. Such devices include a simple micropipette used in conjunction with a mercury covered glass orifice, as shown and described in Crable U.S. Patent 2,922,306, microsyringes, such as those which are frequently used in gas chromatographic work, and gallium covered fritted glass discs through which the sample to be injected is passed as a result of a pressure differential. Each of the types of devices which has been heretofore utilized is characterized by certain disadvantages which limit their use to low temperature operating conditions (such as in the case of the mercury covered orifice system which cannot be utilized at high temperature due to the toxicity of mercury), or which contaminate the liquid sample to be injected, or which result in the incomplete or inaccurate injection of the liquid sample.

The present invention provides a novel device for injecting micro-volumes of a liquid into a high vacuum system at elevated temperatures, and broadly constitutes an improvement upon the type of mercury covered glass orifice apparatus which has been utilized in conjunction with a micropipette in prior art systems.

The device of the invention comprises an elongated, generally tubular, vertically extending vessel which is partitioned into an upper and a lower chamber by a diametrically extending glass plate having an orifice therethrough which places the two chambers in communication with each other. The open upper end of the vessel is closed by means of a suitable, easily removable closure member. A tubular side arm extends from the lower chamber at a point just below the partitioning plate and is adapted for connection to a low pressure region into which it is desired to inject a liquid sample. Suitable conduit and valve means are provided in association with the upper chamber to permit the upper chamber to be evacuated or vented to the atmosphere.

At the lower end of the tubular, vertically extending vessel there is provided a vapor barrier means which functions to prevent vaporized sample from passing out the lower end of the tubular vessel while permitting a heavy, non-volatile liquid, such as gallium or mercury, to gradually pass across the barrier and out of the lower end of the vessel. Connected to the lower end of the vessel through a suitable valve is a reservoir for receiving the heavy, non-volatile liquid. The reservoir is provided with a side arm having interposed therein a suitable valve to permit the reservoir to be evacuated or vented to the atmosphere in accordance with the procedure hereinafter describd. The reservoir is connected to the lower end of the vertically extending tubular vessel through a detachable coupling which permits the reservoir to be removed from the vessel when the valve at the lower end thereof is closed.

In utilizing the described apparatus for injecting a small known volume of liquid material into a high vacuum system, such as a mass spectrometer, the upper chamber of the vertically extending tubular vessel is first filled with a high density, non-volatile, non-reactive liquid. The lower chamber of the vessel is heated by suitable means to the temperature at which it is desired to inject the sample. Prior to the time when it is desired to inject a small known volume of sample liquid into an evacuated space using the device, the upper chamber is closed by means of a suitable closure member. The side arm of the lower chamber is next connected to the evacuated volume or space into which the sample is to be injected and the side arm of the upper chamber is evacuated to reduce the pressure in the upper chamber sufficiently to prevent the non-volatile, inert liquid from flowing into the evacuated lower chamber.

When it is desired to use the apparatus to inject a liquid sample, the upper chamber is slowly vented to atmospheric pressure. Following such venting, the upper end of the upper chamber of the tubular vessel is opened by removing the closure member, and a micropipette carrying a small measured amount of sample is inserted in the upper chamber of the vessel with its tapered tip seated in the orifice through the partitioning plate. The amount of inert, non-volatile liquid held in the upper chamber is sufficient to cover the micropipette and extend above the top thereof. Under the described conditions, due to the large pressure differential which exists between the upper chamber and the lower evacuated chamber, the inert, non-volatile liquid will flow through the pipette from the upper chamber into the lower chamber, thereby flushing out the sample in the bore of the micropipette. Upon passing into the lower chamber, the sample is subjected to the high vacuum prevailing therein and, at the high temperature of the lower chamber, is quickly vaporized and flashed over through the side arm of the lower chamber into the evacuated volume into which it is desired to inject the sample.

When enough of the inert, non-volatile liquid has flowed through the pipette into the lower chamber to assure complete flushing of the liquid sample from the pipette, the pipette is withdrawn from the upper chamber and the upper end of the vessel is again hermetically sealed by replacement of the closure member. The upper chamber is then evacuated to lower the pressure drop across the orifice through the partitioning plate sufficiently to prevent any additional amount of the inert liquid from flowing from the upper chamber into the evacuated lower chamber.

The inert, non-volatile liquid which has passed from the upper chamber into the lower chamber of the tubular vessel accumulates atop the vapor barrier means which is positioned adjacent the lower end thereof, and which is preferably a conventional bubble cap structure. The inert liquid and bubble cap structure together form a vapor seal preventing the vaporized sample from escaping from the lower end of the tubular, vertically extending vessel. The reservoir for receiving the inert liquid has, like the lower chamber of the vertically extending vessel, been evacuated so that only a small pressure differential exists across the vapor barrier means at the lower end of the vessel. It is therefore not necessary, as in the case of prior art devices, to pass an extremely large amount of the inert, non-volatile liquid into the lower chamber of the vessel for the purpose of preventing the inflow thereinto of air from the atmosphere through the lower end of the vessel.

The inert liquid slowly passes through the vapor barrier means in the lower portion of the vertically extending vessel and then flows through the valve at the lower end of the vessel and into the inert liquid reservoir which is attached to the lower end of the vessel through a detachable coupling. In an alternative method of operation, the valve at the lower end of the vessel may be maintained in a closed position during the major portion of the operation of the device. As inert liquid passes through the vapor barrier and builds up above the valve, the seal between the valve and the lower portion of the vessel will be re-enforced due to the presence of a slight head of the liquid inside the vessel. At some time before the upper surface of the accumulated liquid reaches any portion of the vapor barrier, the valve may then be opened and the inert liquid allowed to flow into the reservoir beneath the valve. When it is desired to replenish the supply of inert liquid in the upper chamber of the vertically extending tubular vessel, this may be accomplished by isolating the reservoir from the lower chamber of the vessel by the closure of the valve positioned in the lower end of the vessel. The coupling which connects the inert liquid reservoir with the vertically extending vessel is then disconnected, and the inert liquid is poured from the reservoir back into the upper chamber of the vessel after removing the closure member which is used to hermetically seal the upper end of the tubular vessel.

As a result of the employment of the bubble cap type vapor barrier means in the lower end of the vertically extending tubular member, and the provision in association therewith of an easily evacuated, inert liquid reservoir, it is not necessary to maintain excessively large amounts of the inert liquid in the lower chamber of the vertically extending vessel in order to provide a sufficient seal against the ingress of air from the atmosphere into the highly evacuated lower chamber. Moreover, by virtue of the small, economical amounts of gallium or other highly desirable, yet relatively expensive, liquid materials which may be utilized in the apparatus, it is unnecessary to utilize mercury as the inert liquid material, thereby permitting the apparatus to be utilized at high temperatures with safety.

The provision of means for hermetically sealing the upper end of the vertically extending vessel, and for evacuating the upper chamber of the vessel permits the amount of oxidation of the liquid in the upper chamber which normally occurs in prior art types of devices to be substantially reduced. This results in an attendant reduction in the amount of fouling of the orifice through the partition plate which normally occurs. Moreover, because of the ability to terminate the flow of the inert liquid from the upper into the lower chamber of the vertically extending vessel by reduction of the pressure differential across the partitioning plate, the device may be used repeatedly for several times, whereas, without such means of arresting the flow of liquid metal across the partitioning plate, as in prior art types of devices, utilization of the device is limited to a very small number of sample injections.

From the foregoing description of the invention, it will be apparent that an important object of the present invention is to provide an improved device for introducing micro-volumes of liquid materials into a highly evacuated environment, such as a mass spectrometer inlet, or other low pressure volume, without disruption of the vacuum system or contamination of the sample.

A further object of the present invention is to permit smaller amounts of expensive liquid metals to be utilized in an apparatus of the type which utilizes a liquid metal covered orifice for injecting small amounts of a sample liquid into an evacuated space.

A further object of the invention is to reduce atmospheric contamination of the liquid metal which is utilized in certain types of devices for injecting micro-volumes of liquid into a high vacuum system.

In addition to the foregoing described objects and advantages of the invention, additional objects and advantages of the invention will become apparent when the following detailed disclosure of the invention is read in conjunction with the accompanying drawings which illustrate our invention.

Figures 1A, 1B:
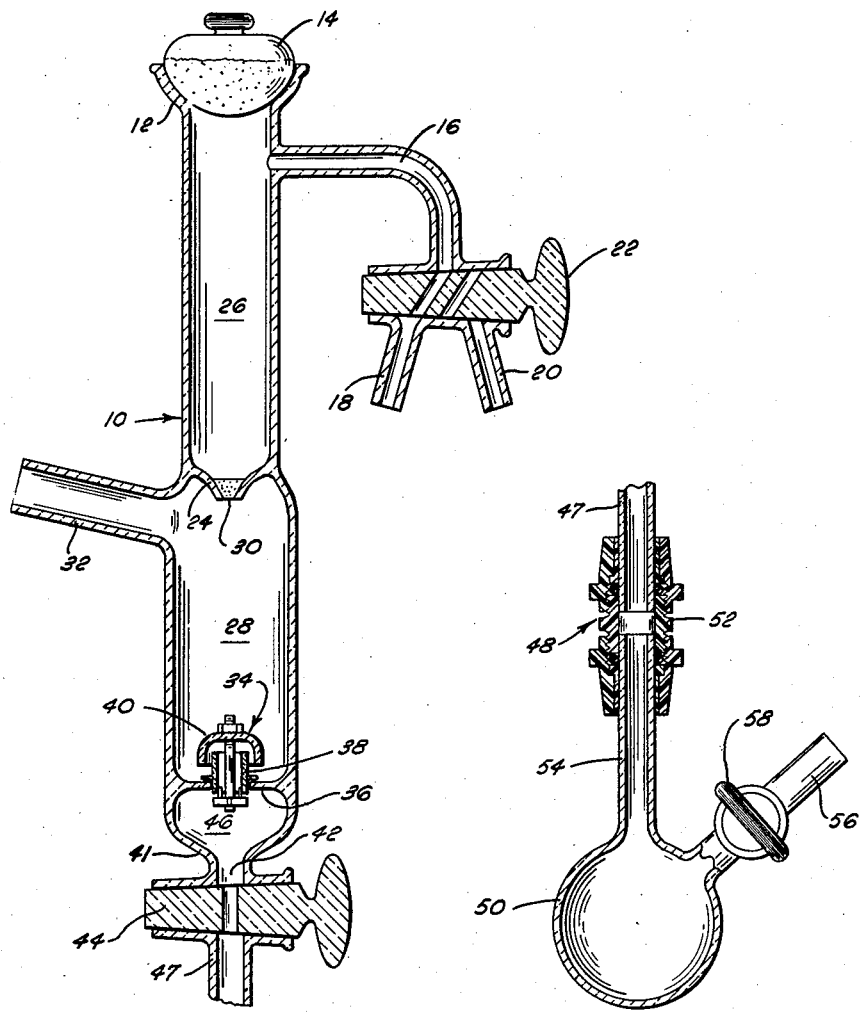
FIGURE 1A is a vertical sectional view through the upper portion of one embodiment of the present invention.
FIGURE 1B is a vertical sectional view through the lower portion of the apparatus. The structures shown in FIGURES 1A and 1B are integral in actuality and are broken in the drawings at the points indicated to facilitate depiction in a minimum space.

Referring to the drawings in detail, reference character 10 generally designates an elongated, generally tubular, vertically extending vessel. For most applications, such as the injection of a highly heated gaseous sample into a mass spectrometer, the vessel 10 may suitably be constructed of glass. However, other materials of construction which are inert with respect to the hot gaseous sample once vaporized, and the inert, non-volatile liquid which is used for flushing the sample into the lower portion of the vessel 10 in the manner hereinafter described may also be used.

Adjacent its upper end, the vessel 10 is flared outwardly to form a hemispherical mouth 12. The mouth 12 of the vessel 10 is preferably frosted or ground along its inner surface when the vessel is constructed of glass so that a seal may be formed with a suitable closure member, such as the ground glass ball 14. Subjacent the mouth 12 of the vessel 10, and extending radially outward from one side of the vessel 10, is a tubular side arm 16. The side arm 16 is bifurcated, having a pair of branches 18 and 20. The branches 18 and 20 are alternately placed in communication with the side arm 16 through a stopcock 22 or other suitable valve member. Approximately intermediate the length of the tubular vessel 10, a transversely extending partition plate 24 is provided to partition the vessel into an upper chamber 26 and a lower chamber 28. An orifice 30 is formed through the partition plate 24 and places the upper chamber 26 and the lower chamber 28 in communication with each other.

The partition plate 24 is preferably constructed of glass and is formed integrally with the vertically extending tubular vessel 10 when the latter is formed of glass. In a preferred embodiment of the invention, the partition plate 24 tapers downwardly about the orifice 30 so that the configuration of the orifice is generally frusto-conical. The surface of the partition plate 24 about the orifice 30 is frosted or ground so that a seal may be formed with the ground glass tip of a sample injecting pipette in the manner hereinafter described.

Just beneath the partition plate 24, a second side arm 32 extends outwardly from the lower chamber 28 of the vertically extending vessel 10 and is adapted to be connected to a high vacuum volume into which the sample is to be injected. Forming the bottom of the chamber 28 is a vapor barrier member which, in a preferred embodiment of the invention, constitutes a bubble cap assembly 34. The bubble cap assembly includes a transversely extending plate 36 having a downspout 38 extending therethrough, which downspout is covered by a bell-shaped cap 40. Bubble caps of this or related construction are well known to those skilled in the art, and the specific type of structure utilized to provide the three elements in substantially the same relation illustrated in FIGURE 1A is not critical to the proper functioning of the invention.

The tubular vessel 10 extends a relatively short distance below the bubble cap assembly 34 and then converges, or is necked down, to a relatively small bore 42 which is opened and closed by means of a stopcock 44 or other suitable valve member. It will be perceived that a space 46 is defined between the stopcock 44 and the bubble cap assembly 34. The necked down portion 47 of the tubular vessel 10 extends downwardly below the stopcock and is connected through a coupling designated generally by reference character 48 to a bulbular reservoir 50. The coupling 48 may be of any suitable type which may be employed to readily connect or disconnect the reservoir 50 to the lower end of the necked down portion 47 of the tubular vessel 10. Preferably, the portion 52 of the coupling which is exposed to contact with the liquid material flowing through the necked down portion 47 into the reservoir 50 is constructed of a plastic, such as Teflon or other material which is relatively inert to such liquid material. The reservoir 50 has, in addition to an elongated neck portion 54 which is connected through the coupling 48 to the necked down portion 47 of the tubular vessel 10, a side or branch arm 56 which is provided with a suitable stopcock or valve 58 to permit the bore through the side arm 56 to be opened or closed as may be desired.

*Operation*

Having described the various elements of the apparatus of the present invention and their arrangement relative to each other, the manner in which the apparatus is utilized will next be described. Since one of the primary advantages of the invention is its facilitation of the injection of a small known volume of liquid into an evacuated space after the liquid sample has been heated to a high temperature, the operation of the device in accomplishing such high temperature injection will be described.

In order to heat the sample to a high temperature, such as around 350° C., preparatory to injecting the sample in vaporized form into a mass spectrometer or other evacuated volume, a suitable heating device, such as a heating tape or coil, is placed around the vertically extending vessel 26 and extends from the uppermost side arm 16 to adjacent the vapor barrier means 34. In this way, both the chambers 26 and 28 may be heated to a desired sample injection temperature.

In preparing the apparatus for the injection of a liquid sample, an inert, non-volatile liquid is initially placed in the upper chamber 26 of the vessel 10. This is accomplished by removal of the ball member 14 which normally provides a sealed closure of the mouth 12 at the upper end of the vessel 10. The amount of the inert, non-volatile liquid which is placed in the chamber 26 will be a volume less than that required to fill the chamber to the side arm 16, but considerably more than that required to cover the top of a micro-pipette which is subsequently placed in the chamber 26.

The inert, non-volatile liquid which is placed in the chamber 26 may be any liquid material having the properties of relatively high density, high surface tension, low vapor pressure or non-volatility, and inertness with respect to both the liquid sample which is to be injected into the evacuated space and any metallic or plastic components which are utilized in the construction of the apparatus. Preferably, a low melting point metal, such as gallium, mercury, tin, indium or a eutectic mixture of gallium, indium and tin, is used as the inert liquid which is placed in the chamber 26. The function of this liquid and its requisite properties will be better understood as the description of the invention proceeds.

After the desired amount of inert, non-volatile liquid has been placed in the chamber 26, the ground glass ball member 14 is replaced in the flared mouth portion 12 of the vessel 10 and the stopcock 22 is turned to place one of the branches 20 or 18 in communication with the side arm 16. The branch 18 or 20 which is in communication with the side arm 16 is then connected to a source of vacuum. The chamber 26 is evacuated so that the pressure in this space is equal to, or only slightly higher than, the pressure in the lower chamber 28 which is connected to the evacuated space into which the sample is to be injected through the side arm 32. In actuality, equalization of the pressures in the chambers 26 and 28 is not essential if the surface tension properties of the inert liquid used in the chamber 26 are such that the liquid will not flow through the orifice 30 provided in the partition plate 24. Since this orifice is extremely small in size, it will be understood that with most inert, high density liquids, a substantial pressure differential can exist across the partition plate 24 without the seepage of the inert liquid through the orifice 30.

In order to collect the inert, non-volatile liquid which has passed into the lower chamber 28, the bulbular reservoir 50 is evacuated through its side arm 56 and the stopcock 44 to substantially the same pressure as that which prevails in the lower chamber 28. The stopcock 44 is then opened to place the lower chamber 28 in communication with the reservoir 50. This status of the stopcock 44 and the reservoir 50 are maintained until a later time during the operation of the system as hereinafter described.

With the inert, non-volatile liquid in the chamber 26 retained therein by evacuation of this chamber in the manner described, the apparatus may be allowed to remain in this status until such time as the liquid sample to be injected has been made ready for introduction into the capillary bore of a micropipette. Having filled the bore of the micropipette with a known volume of the sample liquid, the stopcock 22 is next rotated to slowly vent the chamber 26 to the atmosphere. As soon as atmospheric pressure is achieved in the chamber 26, the ball member 14 may be removed from the mouth 12 and the micropipette inserted therethrough. The micropipette is lowered until its conically-shaped lower end seats in the conically-shaped orifice 30. At this time, the open upper end of the capillary bore through the micropipette will be submerged below the surface of the inert, non-volatile liquid in the chamber 26. Due to the great pressure differential which exists between the chamber 26 and the chamber 28, the inert liquid will be flushed through the bore of the micropipette, driving the liquid sample before it into the heated, highly evacuated lower chamber 28. When the liquid sample has been flushed through the pipette, and enough additional inert, non-volatile liquid has passed through the pipette into the lower chamber 28 to insure complete flushing of the sample, the pipette is withdrawn from the chamber 26 and the ball joint cap 14 is replaced in the flared mouth 12 of the vessel 10. The stopcock 22 is rotated to close the side arm 16 to the atmosphere and to connect it instead with the branch 18 or 20 which is connected to a source of vacuum. The chamber 26 is then again evacuated to reduce the pressure differential across the partition plate 24 sufficiently to stop the flow of the inert, non-volatile liquid through the orifice 30.

At this point in the operation of the device, the liquid sample which has passed through the micropipette and orifice 30 into the lower chamber 28 has been vaporized by the extremely low pressure therein and by the high temperature. The pressure generated by the vaporization of the sample, and the reduction in the volume of the chamber 28 by the presence of the inert, non-volatile liquid therein causes the vaporized sample to expand through the side arm 32 into the evacuated space into which it is desired to inject the sample. In the case of a mass spectrometer, this will be a known volume, and the presence of the vaporized sample in such volume will exert a partial pressure which is always directly related to the volume of sample which has been introduced into the chamber 28 from the micropipette in the chamber 26.

The vaporized sample in the chamber 28 and the side arm 32 is prevented from escaping from the bottom of the vessel 10 by the vapor barrier which is formed by the bubble cap assembly 34 and the inert, non-volatile liquid which has accumulated thereon. Since the pressure differential across the bubble cap assembly 34 has been substantially reduced by evacuation of the bulbular reservoir 50 through the side arm 56, only a small amount of the inert, non-volatile liquid needs to exist on the plate 36 in order to prevent air from the space 46 from passing across the vapor barrier and contaminating the sample contained in the chamber 28 above the barrier. In prior art devices, it was necessary to extend the lower portion of vessel 10 to the length of over 760 millimeters when mercury was used. A relatively large quantity of fluid was then placed in the extended portion whereby a vacuum was created in the sample chamber much in the manner that a vacuum may be created in a U-tube barometer. The length, 760 millimeters, was commonly used inasmuch as mercury was most often utilized as the inert fluid. It will, of course, be understood that this length will increase or decrease should other inert fluids be chosen for use in prior art devices. This increase or decrease was brought about due to the differences in specific gravity between the various liquids. This required the use of large, and frequently extremely costly, amounts of the inert, non-volatile liquid.

In the bubble cap assembly which is utilized in a preferred embodiment of the invention and which is shown in FIGURE 1, the height which the downspout 38 extends above the plate 36 is adjusted so that a sufficient head of the inert, non-volatile liquid will reside on the plate 36 to prevent the vaporized liquid sample from passing through the downspout into the space 46 therebelow. However, since the volumes of liquid samples which are handled by the apparatus of the invention are extremely small, these samples exert a relatively small pressure when they are vaporized by introduction to the chamber 28, and therefore only a very small amount of liquid head is required at the bubble cap assembly 34 in order to prevent leakage of the vapor through the assembly into the space 46.

The amount of inert, non-volatile liquid in excess of that which is required to maintain a vapor barrier on top of the plate 36 drains through the downspout 38 into the necked down portion 41 of the tubular vessel 10. The excess liquid then passes through the stopcock 44, through the coupling 48 and into the bulbular reservoir 50. At the termination of the sample run, the amount of inert, non-volatile liquid remaining on the upper surface of the plate 36 will be only an amount equal in height to the distance by which the downspout 38 projects above the plate 36.

As has been previously indicated, upon completion of the flushing of the sample through the micropipette into the chamber 28, the micropipette is removed from the chamber 26 and this chamber again evacuated by means of the stopcock 22 and the side arm 16. At this time, no further flow of the inert, non-volatile liquid from the chamber 26 into the chamber 28 can occur. It will be therefore perceived that at this time the apparatus has been returned to its original status as it existed prior to the injection of the initial liquid sample. It is thus prepared for the injection of a second sample from the chamber 28 and side arm 32 into the evacuated space. Since the size of the chamber 26 is sufficient to permit enough of the inert liquid to be contained therein to inject a number of samples prior to the exhaustion of the inert liquid in the chamber 26 below the open upper end of the micropipette, the apparatus may be reused a number of times in the manner hereinbefore prescribed without replenishing the supply of the inert liquid. However, after the supply of the inert liquid in the chamber 26 has been depleted to the point where it is no longer sufficient to cover the open upper end of the micropipette when it is inserted therein, the stopcock 44 in the necked down portion 41 of the tubular member 10 is closed, the stopcock 58 in the side arm 56 is opened slightly to vent the bulbular reservoir 50 to the atmosphere, and the coupling 48 is disconnected to permit the bulbular reservoir to be detached from the necked down portion 41 of the tubular vessel 10. The chamber 26 may then be slowly opened to the atmosphere, the ball closure member 14 removed, and the inert, non-volatile liquid which has accumulated in the reservoir 50 returned to the chamber 26 through the flared mouth 12.

From the foregoing description, it will be perceived that the present invention provides a novel and highly useful device for injecting small, known volumes of a liquid material into an evacuated space in an accurate and contaminant-free manner. The device may be employed using, where desired, relatively small amounts of expensive, low melting point metals of the type hereinbefore described, and the use of the device is not limited to low temperature injections, nor to inert, non-volatile liquids of relatively low cost, but poor properties.

Although a number of modifications and innovations in the structure hereinbefore described will occur to those skilled in the art, it is intended that such modifications and changes shall be encompassed within the spirit and scope of the present invention, provided the overall structure including such modifications does not depart from the basic principles underlying the invention as defined in the appended claims.

We claim:
1. A device for injecting a liquid into a high vacuum system comprising:
    (a) an elongated, vertically extending vessel;
    (b) a partition member positioned intermediate the ends of said vessel and having an orifice therethrough placing the two chambers defined in said tubular vessel by said partition member in communication with each other;
    (c) means for hermetically sealing the open upper end of said elongated, vertically extending vessel;
    (d) means for evacuating the portion of said vessel above said partition member when the open upper end of said vessel is sealed by said sealing means;
    (e) vapor barrier means adjacent the lower end of said tubular, vertically extending vessel for preventing vapor from passing out the lower end of said vessel while permitting liquid so to pass;
    (f) a tubular side arm extending from said tubular, vertically extending vessel between said partition and said vapor barrier means; and
    (g) valve means connected to the lower end of said vertically extending vessel for connecting the lower end of said vessel to a source of vacuum whereby the pressure may be substantially equalized on opposite sides of said vapor barrier means.

2. A device for injecting a liquid into a high vacuum system as claimed in claim 1 wherein said valve means comprises:
    (a) a hollow, necked down portion on the lower end of said tubular, vertically extending vessel;
    (b) a valve in said necked down portion for hermetically sealing said vessel at the lower end thereof;
    (c) a reservoir detachably connected to said necked down portion below the valve therein for receiving liquid passing through said necked down portion and the valve therein from said vapor barrier means;
    (d) a tubular arm extending from said reservoir adapted for connection to a source of vacuum; and
    (e) a valve in said tubular arm.

3. A device for injecting a liquid into a high vacuum system as claimed in claim 1 wherein said vapor barrier means comprises:
    (a) an apertured plate extending diametrically across said tubular vessel; and
    (b) a bubble cap obstructing the aperture through said plate.

4. A device for injecting a liquid into a high vacuum system as claimed in claim 1 wherein said partition member comprises a glass plate extending diametrically across said tubular vessel and having its portion defining said orifice ground to provide a sealing surface for engagement with another ground glass surface.

5. A device for injecting a liquid into a high vacuum system comprising:
   (a) an elongated, generally tubular, vertically extending vessel having an open upper end and a lower end;
   (b) a partition member positioned intermediate the ends of said vessel and having an orifice therethrough placing the two chambers defined in said tubular vessel by said partition member in communication with each other;
   (c) a first tubular side arm extending from said tubular, vertically extending vessel below said partition and adapted for connection to a low pressure region into which said liquid is to be injected;
   (d) a second tubular side arm extending from said tubular, vertically extending vessel adjacent the upper end thereof;
   (e) a valve associated with said second tubular side arm for placing said second side arm in communication with a source of vacuum;
   (f) means for hermetically sealing the open upper end of said tubular, vertically extending vessel;
   (g) vapor barrier means adjacent the lower end of said tubular, vertically extending vessel for preventing vapor from passing out the lower end of said vessel while permitting liquid so to pass; and
   (h) valve means connected to the lower end of said tubular, vertically extending vessel for connecting the lower end of said vessel to a source of vacuum whereby the pressure may be equalized on opposite sides of said vapor barrier means.

6. A device for injecting a liquid into a high vacuum system as claimed in claim 5 wherein said valve means comprises:
   (a) a hollow necked down portion on the lower end of said tubular vertically extending vessel;
   (b) a valve in said necked down portion for hermetically sealing said vessel at the lower end thereof;
   (c) a reservoir detachably connected to said necked down portion below the valve therein for receiving liquid passing through said necked down portion and the valve therein from said vapor barrier means;
   (d) a tubular arm extending from said reservoir and adapted for connection to a source of vacuum; and
   (e) a valve in the tubular arm of said reservoir.

7. A device for injecting a liquid into a high vacuum system as claimed in claim 5 wherein said vapor barrier means comprises:
   (a) an apertured plate extending diametrically across said tubular vessel; and
   (b) a bubble cap obstructing the aperture through said plate.

8. A device for injecting a liquid into a high vacuum system as claimed in claim 5 wherein said partition member comprises a glass plate extending diametrically across said tubular vessel and having its portion defining said orifice ground to provide a sealing surface for engagement with another ground glass surface.

9. A device for injecting a liquid into a high vacuum system as defined in claim 5 wherein said second tubular side arm is bifurcated, and the valve associated with said second tubular side arm is a two-way valve positioned for alternately placing the two legs forming said bifurcation in communication with said vertically extending tubular vessel.

References Cited by the Examiner
UNITED STATES PATENTS

| | | | |
|---|---|---|---|
| 2,667,075 | 1/54 | Blum | 73—425.4 |
| 2,922,306 | 1/60 | Crable | 73—425.4 |
| 2,991,647 | 7/61 | Harris | 73—425.4 X |

RICHARD C. QUIESSER, *Primary Examiner.*

JOSEPH P. STRIZAK, *Examiner.*